June 7, 1966     R. A. POWERS ET AL     3,255,044
REDOX COUPLE RADIATION CELL
Filed Aug. 31, 1960
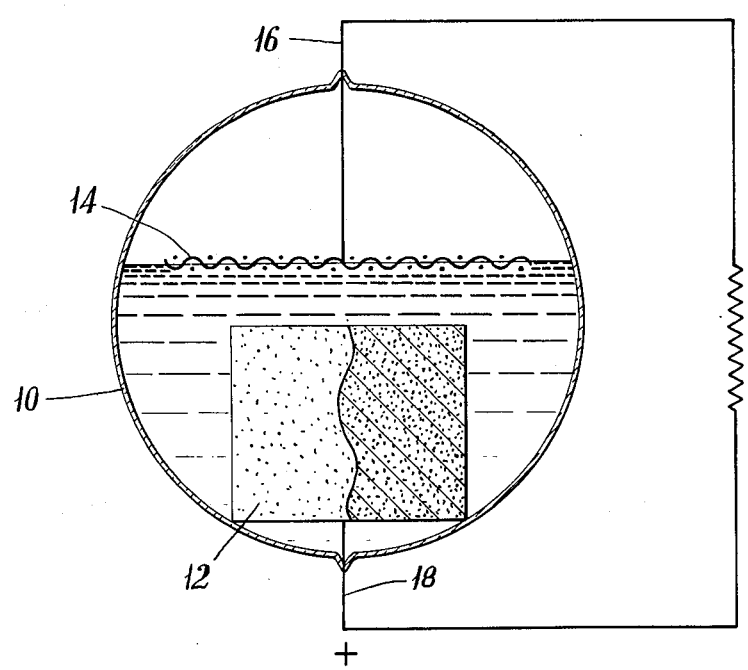
INVENTORS
ROBERT A. POWERS
DOUGLAS R. ALLENSON
ALBERT C. STEWART
BY *John F. Hohmann*
ATTORNEY United States Patent Office 3,255,044
Patented June 7, 1966

3,255,044
REDOX COUPLE RADIATION CELL
Robert A. Powers, Lakewood, and Douglas R. Allenson and Albert C. Stewart, Cleveland, Ohio, assignors to Union Carbide Corporation, a corporation of New York
Filed Aug. 31, 1960, Ser. No. 53,213
10 Claims. (Cl. 136—86)

This invention is concerned with a sealed, self-contained device for converting high energy radiation to electricity.

It is known that aqueous solutions of redox couples are in some way affected by radiation. This effect generally manifests itself in the production of hydrogen gas and an oxidized species of the redox couple. While this phenomenon is known to science, it has never been advantageously used in a practical device for generating electricity in useful quantities.

It is the principal object of the present invention to provide an electrochemical device utilizing radiation and employing a homogeneous electrolyte and a soluble redox couple depolarizer which will continue to operate after having been stirred or mixed.

Another object is to provide an electrochemical cell employing a single electrolyte and a soluble redox couple depolarizer in which the conventional separator between anode and cathode is not required.

Another object is to provide an electrochemical cell which may be used for the direct conversion of radiation to electrical energy without the use of thermal cycles, electrical generating machinery or semi-conductive material.

A further object of this invention is to provide a sealed cell by which the action of radiation converts electrochemical species into electrical energy in situ without the necessity of an external electrical cell.

Fulfilling these objects this invention includes a radiation cell having an aqueous electrolyte; a redox couple acting as depolarizer and dissolved in the electrolyte; a catalyzed inert anode; a porous cathode; and a sealed container of larger volume than the total volume of the anode, cathode and electrolyte. A cell according to this invention operates in the presence of a source of high energy radiation.

Radiation penetrates through the graphite, glass or metal container or may be otherwise admitted and acts upon the redox couple solution in such manner as to form hydrogen gas and an oxidized species of the redox couple. These recombine to their former state at appropriate electrodes. Electrons are liberated at the anode and absorbed at the cathode and cause a potential difference between anode and cathode which permits current flow through the external load circuit.

This invention will be better understood with reference to the single figure of the accompanying drawing which is an elevation in section with parts broken away of a cell embodying this invention.

Referring to the drawing, a cell embodying this invention comprises a sealed vessel 10 partially filled with a liquid electrolyte which together define a gas space bounded by the vessel walls and the electrolyte. A porous cathode 12 is immersed in the electrolyte. Spaced apart from the cathode 12 and at the liquid-gas interface is an anode 14. Electrical leads 16 and 18 extend from the anode 14 and the cathode 12 respectively to an external load, which may be represented, as shown, as a resistance. It is important that a depolarizer, more particularly described below, be dissolved in the electrolyte to form a homogeneous solution.

In the gravity separation cell of this invention, the electrolyte may be acid, neutral or basic. An acid electrolyte is preferred and dilute sulfuric or hydrochloric acid is suitable with the hydrogen-ferric system. The cathode 12 is preferably a porous material which is not deleteriously affected by radiation, has a high overvoltage for the conversion of hydrogen to hydrogen ion and is preferably carbon. The anode 14 must have a low overvoltage for the conversion of hydrogen to hydrogen ion and is suitably a platinum group metal, preferably platinum. Suitable depolarizers for this cell are those which are soluble in the electrolyte and consist of oxidized redox couples. Examples of some of the suitable redox couples are ferrous/ferric; selenite/selenate; arsenite/arsenate; and uranous/uranyl.

The exact mechanism of reaction which takes place in the cell of this invention is not known. It has been postulated that under the action of radiation and in the presence of the reduced form of the redox couple, the electrolyte forms hydrogen and ferric ions. It has also been postulated that hydrogen molecule ions ($H_2^+$) form, which subsequently oxidize the reduced form of the redox couple to give hydrogen. While it has not as yet been ascertained which, if any, of these theories accurately describe the phenomenon actually taking place, it is known that hydrogen is evolved into the gas space defined by the electrolyte and the container.

When the solution in the cell of the invention is exposed to high energy radiation, hydrogen and ferric ions are produced.

As an example of the practice of the invention, a cell, as above described, was filled up to its platinum anode with 0.01 M $Fe(NH_4)_2(SO_4)_2$ in 0.8 N $H_2SO_4$ solution and sealed. Under the influence of gamma radiation from $Co^{60}$, the acid ferrous ammonium sulfate solution decomposed to form equivalent amounts of hydrogen and ferric ions in accord with the widely postulated radiation chemistry reactions:

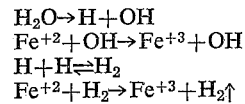

$$H_2O \rightarrow H + OH$$
$$Fe^{+2} + OH \rightarrow Fe^{+3} + OH$$
$$H + H \rightleftharpoons H_2$$
$$Fe^{+2} + H_2 \rightarrow Fe^{+3} + H_2\uparrow$$

The hydrogen formed passed into the gas space while the ferric ion remains in the electrolyte in contact with the porous carbon cathode. The oxidized and reduced products of the radiochemical process are thus separated and made available to the proper electrodes for electrochemical recombination without transport to an external cell. One particular advantage of the present converter is that the electrodes are catalyzed specifically to react with one electrochemical species in the cell in the presence of the others and therefore that the cell does not require mechanical, ionic or gravitational separators previously employed in converting high energy radiation to electricity.

The cell produced current derived from cobalt 60 for four weeks on a continuous basis. The continuous power output was 1.0 ma. at 0.75 volt corresponding to about 1½ percent of the radiation energy absorbed. The cell has the additional advantage in that none of the components is susceptible to the deleterious effects of radiation as other systems may be. It needs only to be placed in a radiation field to operate.

Operation of the cell may be of two types. Highly ionizing radiation, alpha, beta, or gamma rays, may be used to produce $H_2$ and $Fe^{+++}$ over a period of time for later use. The back reaction rate of $H_2$ and $Fe^{+++}$ is quite low because of the design of the cell and nature of the electrodes. In a cell where $H_2$ and $Fe^{+++}$ were produced by $Co^{60}$ gamma radiation, the back reaction rate was one percent of the rate of formation. On the other hand, the cell may be used to produce power continuously so long as it is in a radiation field or contains an internal source of radiant energy, such as a radionuclide dissolved in solution (Sr 90, etc.).

Many variations are possible in the size and shape of container, number, size and arrangement of the electrodes in the soluble depolarizer, and in the electrolyte employed in the present cells.

Thus, the cell of the invention may be operated in the presence of a source of ultraviolet radiation, as will become apparent from the following example.

A spherical cell having a fused quartz container above described was filled up to its platinum anode with 0.1 molar ferrous sulfate in 0.5 molar sulfuric acid solution and sealed. Under the influence of ultraviolet radiation from a mercury resonance lamp operating in a water bath at 25° C., and which produced approximately 85 percent of its radiation at 2537 A., the ferrous sulfate solution decomposed to form equivalent amounts of hydrogen and ferric ions. Hydrogen formed passed into the gas space while the ferric ion formed remained in the electrolyte in contact with the porous cathode. The oxidized and reduced products of the radiochemical process were thus separated and made available to the proper electrodes for electrochemical recombination without transport to an external cell. The cell produced current derived from the ultraviolet radiation source for 24 hours on a continuous basis. The power output was a continuous current of 1.7 ma. at 0.34 volt. The open circuit potential of the cell was found to be 0.6 volt. The maximum current obtainable from this cell was found to be 1.88 ma. This cell has an additional advantage in that none of its components is susceptible to any deleterious effects of radiation. It needs only a source of such radiation in order to operate. Shorter wave length radiation such as soft and hard X-ray radiation may be used instead of ultraviolet radiation.

What is claimed is:

1. A device for producing electrical energy comprising a sealed vessel, an electrolyte partially filling said vessel, an inert cathode immersed in said electrolyte, said cathode having a high overvoltage for the reaction $H_2 \rightarrow H^+$, an inert anode having a low overvoltage for the same reaction and having at least on the surface thereof a hydrogen catalyst, said anode being located at the interface of said electrolyte, and a gas space defined by said electrolyte and the walls of said vessel, a radiation sensitive redox couple in contact with said electrolyte, and means for connecting said anode and cathode to an external circuit.

2. A device for producing electrical energy comprising a sealed vessel, an electrolyte partially filling said vessel, an inert cathode immersed in said electrolyte, said cathode having a high overvoltage for the reaction $H_2 \rightarrow H^+$, an inert anode having a low overvoltage for the same reaction and having at least on the surface thereof a hydrogen catalyst, said anode being located at the interface of said electrolyte, and a gas space defined by said electrolyte and the walls of said vessel, an oxidized form of a radiation sensitive soluble redox couple in said electrolyte, said redox couple being reduced by electrochemical action in said cell, and means for connecting said anode and cathode to an external circuit.

3. The device of claim 2 wherein said oxidized depolizer is ferric ammonium sulfate.

4. A device for converting high energy radiation to electrical energy comprising a sealed vessel, an electrolyte partially filling said vessel thereby defining a gas space between said electrolyte and the walls of said vessel, a reduced form of a radiation sensitive redox couple dissolved in said electrolyte, hydrogen gas in said gas space, an inert cathode immersed in said electrolyte, said cathode having a high overvoltage for the reaction $H_2 \rightarrow H^+$, an inert anode having a low overvoltage for the same reaction and having at least on the surface thereof a hydrogen catalyst, said anode being located at the interface of said electrolyte and said gas space, said redox couple tending to be oxidized when subjected to radiation, and means for connecting said anode and said cathode to an external circuit.

5. The device of claim 4 wherein said redox couple is selected from the group consisting of ferrous/ferric; selenite/selenate; arsenite/arsenate; and uranous/uranyl.

6. The device of claim 4 wherein said electrolyte contains a radionuclide dissolved therein.

7. A device for converting ultraviolet radiation to electrical energy which comprises a sealed vessel transparent to ultraviolet radiation partially filled with an aqueous electrolyte; a redox couple depolarizer dissolved in said electrolyte; an inert porous cathode immersed in said electrolyte; an inert anode spaced from said cathode at the interface of said electrolyte, a gas space defined by said electrolyte and said vessel; and means for connecting said anode and cathode to an external circuit.

8. The device described in claim 7, wherein said electrolyte is a dilute acid and said depolarizer is selected from the group consisting of ferrous/ferric; selenite/selenate; arsenite/arsenate; and uranous/uranyl.

9. The device described in claim 7, wherein said vessel is fused quartz, said anode is a platinum group metal and said cathode is carbon.

10. The device described in claim 7, wherein said vessel is spherical.

References Cited by the Examiner

UNITED STATES PATENTS 2,572,079 10/1951 Von Hippel et al. ____ 136—89.4
2,708,242 5/1955 Ruben _____ 136—89.4

WINSTON A. DOUGLAS, *Primary Examiner.*

JOHN H. MACK, JOHN R. SPECK, *Examiners.*

J. H. BARNEY, A. M. BEKELMAN,
*Assistant Examiners.*